United States Patent [19]

Lowther

[11] 4,228,659
[45] Oct. 21, 1980

[54] GAS TURBINE SYSTEM

[75] Inventor: Frank E. Lowther, Buffalo, N.Y.

[73] Assignee: Purification Sciences Inc., Geneva, N.Y.

[21] Appl. No.: 908,155

[22] Filed: May 22, 1978

Related U.S. Application Data

[63] Continuation-in-part of Ser. No. 879,969, Feb. 21, 1978, and a continuation-in-part of Ser. No. 890,465, Mar. 27, 1978.

[51] Int. Cl.³ .............................................. F01K 25/00
[52] U.S. Cl. ............................ 60/68 Z; 60/39.76
[58] Field of Search ............... 60/39.03, 39.06, 39.23, 60/39.27, 39.29, 39.38, 39.76, 39.78, 643, 650, 39.68, 682

[56] References Cited

U.S. PATENT DOCUMENTS

| | | | |
|---|---|---|---|
| 2,872,786 | 2/1959 | Ergenc | |
| 3,303,643 | 2/1967 | Beardsley | 60/39.02 |
| 3,417,564 | 12/1968 | Call | 60/39.34 |
| 3,488,952 | 1/1970 | Brillo | 60/39.76 |
| 3,501,913 | 3/1970 | Brillo | 60/39.76 |
| 3,623,325 | 11/1971 | Jubb et al. | |
| 3,672,164 | 6/1972 | Pieper | 60/39.38 |
| 3,791,137 | 2/1974 | Jubb et al. | 60/39.18 R |
| 3,992,891 | 11/1976 | Pocrnja | 60/650 |
| 3,995,431 | 12/1976 | Schwartzman | 60/684 |

FOREIGN PATENT DOCUMENTS 2615122 10/1977 Fed. Rep. of Germany ............ 60/650

Primary Examiner—Louis J. Casaregola
Attorney, Agent, or Firm—Robert J. Bird

[57] ABSTRACT

A constant pressure, Brayton cycle gas turbine method and apparatus including a combustion chamber and a turbine and using a hot-cool operating cycle comprising a hot phase alternating with cool phase. Gas is continuously fed to the combustion chamber and from the combustion chamber to the turbine. During the hot phase all of the gas fed to the turbine is hot. The gas temperature during the hot phase is higher than the turbine could withstand in a continuous burn mode. However, the time period of the hot phase is less than the time it would take for the turbine blades to "soak" to the high temperature of the hot gas. This provides a high combustion temperature and high efficiency at all times, eliminating the part-load efficiency loss of the prior art, and also eliminating the need for high temperature materials as well as the prior art compressor requirements for large amounts of air. The gas turbine can be of the closed cycle or open cycle type. Applications include, for example, automobiles, air craft, railroad engines, central station power and golf carts.

5 Claims, 4 Drawing Figures

A   k = 1.67   ($c_p$ = 0.29)
B   k = 1.40   ($c_p$ = 0.24)
C   k = 1.28   ($c_p$ = 0.22)

k = $\gamma$ in other references

GAS TURBINE SYSTEM

CROSS REFERENCE TO RELATED APPLICATIONS

This application is a continuation-in-part of applicant's copending application Ser. No. 879,969, filed Feb. 21, 1978 and entitled "Gas Turbine System"; and is also a continuation-in-part of applicant's copending application Ser. No. 890,465, filed Mar. 27, 1978 and entitled "Gas Turbine System". Each of these two parent applications in their entirety, is hereby incorporated by reference in this application.

BACKGROUND OF THE INVENTION

1. Field of the Invention

This invention relates to gas turbines, and in a preferred embodiment to closed cycle gas turbines (also known as hot air turbines).

2. Description of the Prior Art

Gas turbines including those of the closed cycle type, are old and well-known. Closed cycle gas turbines have many advantages, but also several major disadvantages. One disadvantage has been severe enough to make a closed cycle gas turbine practical only where large amounts of cooling water are available. In the prior art, even if a regenerator is used on a conventional gas turbine, significant amounts of heat still remain in the exhaust gas. If this large amount of hot gas is fed back around to the compressor, severe efficiency penalties are paid in compression according to the prior art. Thus, great amounts of "precooling" water were required and were used. As a result, the closed cycle gas turbine has seen only very limited service.

SUMMARY OF THE PRESENT INVENTION

A preferred embodiment of the present invention combines the advantages of the closed cycle gas turbine with the advantages of the intermittent cycle described in said copending application Ser. No. 879,969. Reference can be had to said copending application for a detailed description of the intermittent operating cycle of the Lowther gas turbine. It is to be noted that all of the different embodiments described in each of said copending parent applications Ser. Nos. 879,969 and 890,465 can be used with the present invention.

Referring now to the present invention, the intermittent cycle of said application Ser. No. 879,969 eliminates the primary disadvantage of the prior art closed cycle gas turbine by reducing both: (1) the quantity of gas required (the intermittent cycle uses a low air-to-fuel ratio, whereas the prior art continuous burn gas turbine uses a high air-to-fuel ratio) and (2) the amount of heat in the exhaust gas (that is, the heat is absorbed into the structure during the relatively short hot phase rather than escaping from the turbine exhaust). The working gas in the present invention is used over and over as in a normal closed cycle gas turbine and remains in its own closed and clean environment. The working gas is heated in an indirect combustion chamber in which air and fuel are burned, and the combustion products exhausted to ambient. The fuel flow to the indirect combustor can be intermittently terminated for the period of time of the cool phase, during which time the working gas is compressed and fed into and out of the turbine cooling the turbine blades and preventing them from soaking to the high temperature of the working gas during the hot phase.

It is an object of the present application to overcome some of the disadvantages in the prior art gas turbines. It is another object of the present invention to provide a closed cycle gas turbine which does not require huge amounts of cooling water and to provide a closed cycle gas turbine which is applicable for use in automobiles, aircraft, railroad engines, central station power, and golf carts, for example. It is another object of the present invention to provide an indirect combustor of the flow-store-exhaust type in which, during the burn phase, the intermittent combustor contains and stores all of the products of combustion for the entire burn period. It is another object of the present invention to provide a hot-cool cycle in which the burning can be carried out substantially continuously with the working gas being fed through the indirect combustor during the hot phase, whereas during the cool phase the working gas by-passes the indirect combustor to obtain the advantages of the hot-cool cycle while still obtaining all of the advantages of the continuous burn operation in the indirect combustor. It is another object of the present invention to provide a brayton cycle, closed cycle gas turbine employing a compressed air storage or surge tank and operating with a hot-cool cycle comprising a hot phase continuously alternating with a cool phase.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENTS

The present invention will be described in detail with reference to the attached drawings. For a detailed description of the intermittent burn cycle, reference should be had to parent application Ser. No. 879,969, incorporated herein by reference, and for a detailed description of various throttling aspects, reference should be had to parent application Ser. No. 890,465 also incorporated herein by reference.

Figure 1:
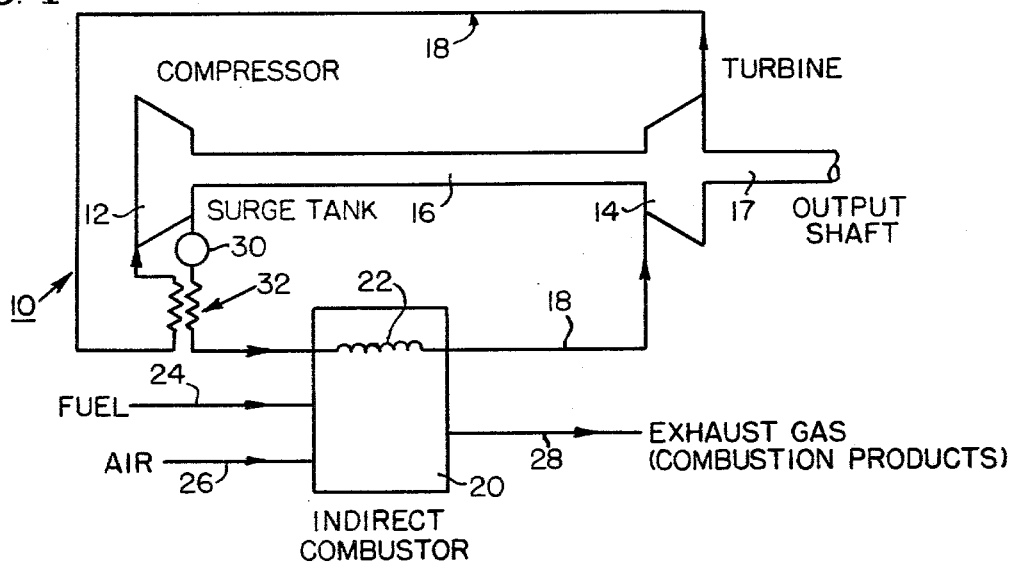
FIG. 1 is a partly schematic, partly diagrammatic drawing of a closed cycle gas turbine, using a hot-cool operating cycle according to the present inventnon.

With reference now to the drawings, FIG. 1 shows a gas turbine 10 including a compressor 12 and a turbine 14 connected to the compressor 12 by a shaft 16 which includes an output shaft portion 17. The gas turbine 10 includes a closed conduit 18 in which a working gas is used over and over and continuously circulates from the compressor to the turbine and then back again to the compressor, preferably after first passing through a heat exchanger 32. The gas turbine 10 also includes an indirect combustor 20 containing a heat exchange portion 22 of the conduit 18, having a heat exchange configuration such as that of a coiled pipe. Fuel is fed into the indirect combustor 20 by way of a fuel line 24 and air is fed into the indirect combustor 20 by way of an air line 26. The exhaust gas or combustion products leave the indirect combustor by way of an exhaust line 28. A compressed air tank or surge tank 30 is preferably in the conduit 18 as described in parent application Ser. No. 879,969. The surge tank 30 can alternatively be located in the conduit 18 between the heat exchanger 32 and the combustor 20.

The operation of the gas turbine 10 shown in FIG. 1 can be the same as that described in parent application Ser. No. 879,969, in which there is a burn phase in which fuel and air are burned in the indirect combustor 20 and then a cool phase in which the fuel flow to the combustor 20 is terminated, for example, by regulator valve (not shown). During the cool phase the working gas continues to circulate through conduit 18, however, since there is no fuel being burned in the combustor 20, the temperature of the working gas quickly falls which results in cooling of the turbine blades in the turbine 14, thus preventing the turbine blades from "soaking" to the same high temperature of that of the working gas during the hot phase. After a selected period of time for the cool period has elapsed, the hot-cool cycle is repeated with another hot phase followed by another cool phase. These phases are continuously alternated in the hot-cool cycle. The initiation of the next hot phase is, of course, started by again feeding fuel into the combustor 20 and burning it.

Figure 2:
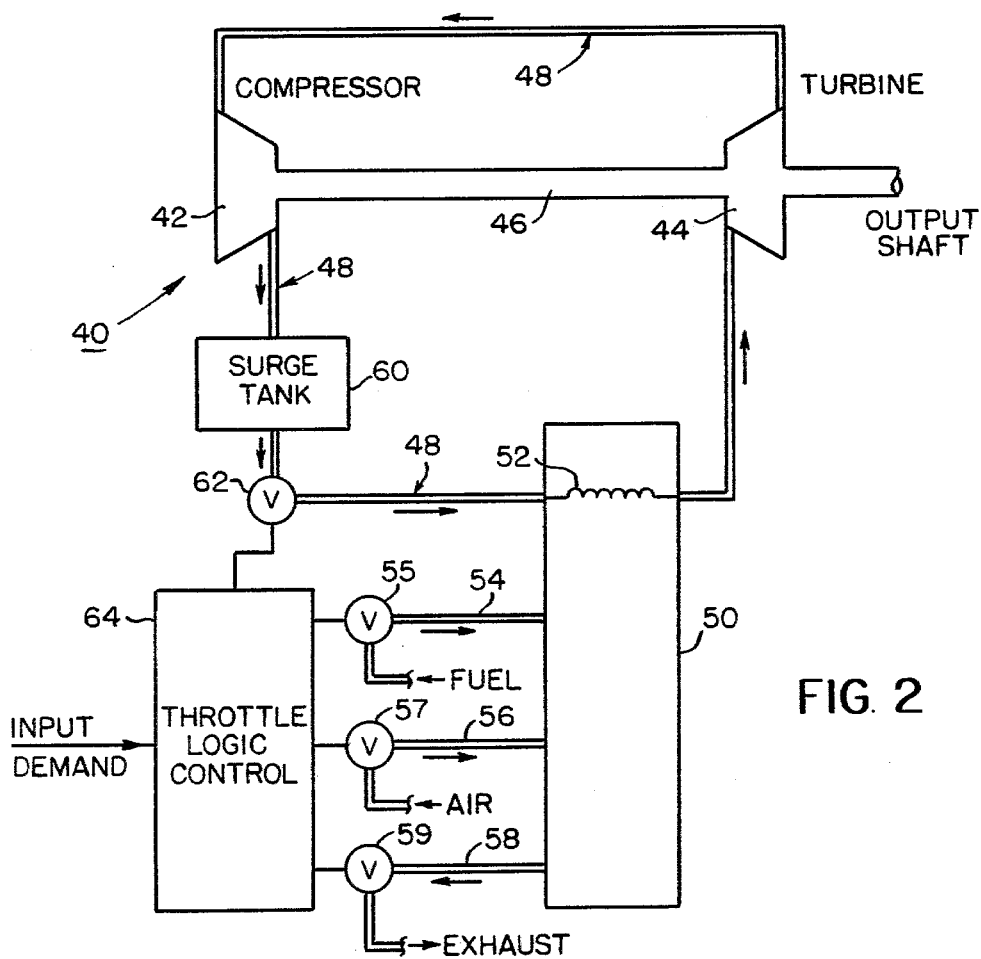
FIG. 2 is a partly schematic, partly diagrammatic drawing of another embodiment of a closed cycle gas turbine using hot-cool operating cycle according to another embodiment of the present invention.

FIG. 2 shows another embodiment of the present invention of a gas turbine 40 including a compressor 42 and a turbine 44 connected to the compressor by a shaft 46. A closed conduit 48 contains the continuously circulating working gas. The gas turbine 40 includes an indirect combustor 50 in which a coiled portion 52 (or some other heat exchange configuration) of the conduit 48 is contained. Fuel is fed into the indirect combustor 50 by means of a fuel line 54 controlled by a regulator valve 55. Air is fed into the combustor 50 by way of a line 56 and a regulator valve 57. The exhaust gas or the combustion products from the indirect combustor 50 are fed out of the combustor 50 by way of an exhaust conduit 58 controlled by a valve 59. The valves 55, 57 and 59 are controlled by a throttle logic control 64 which responds to input demand. In addition, the gas turbine 40 includes a compressed air tank or surge tank 60 directly in the conduit 48 and a regulator valve 62 for controlling the flow from the surge tank 60. The valves 55, 57, 59 and 62 can be solenoid valves, for example, controlled by the throttle logic control 64.

The throttle logic control 64 controls the fuel and air flows according to the intermittent philosophy as described in said parent applications Ser. Nos. 876,969 and 890,465. The working gas flow is controlled according to load demands. The exhaust gas can be held up until its heat has essentially all been transferred to the working gas.

The regulator valve 62 and surge tank 60 can, for example, provide additional quantities of flow of the working gas to the turbine 44 during the cool phase, for example, whereby this additional quantity of working gas can act as the flywheel in place of, for example, a mechanical or electrical flywheel. In addition, such greater quantities of cooler air during the cool phase will cool the turbine at a faster rate than if the same gas rate were used in both the hot and cool phases. The cool phase can, in this way, be shortened in duration.

Figure 3:
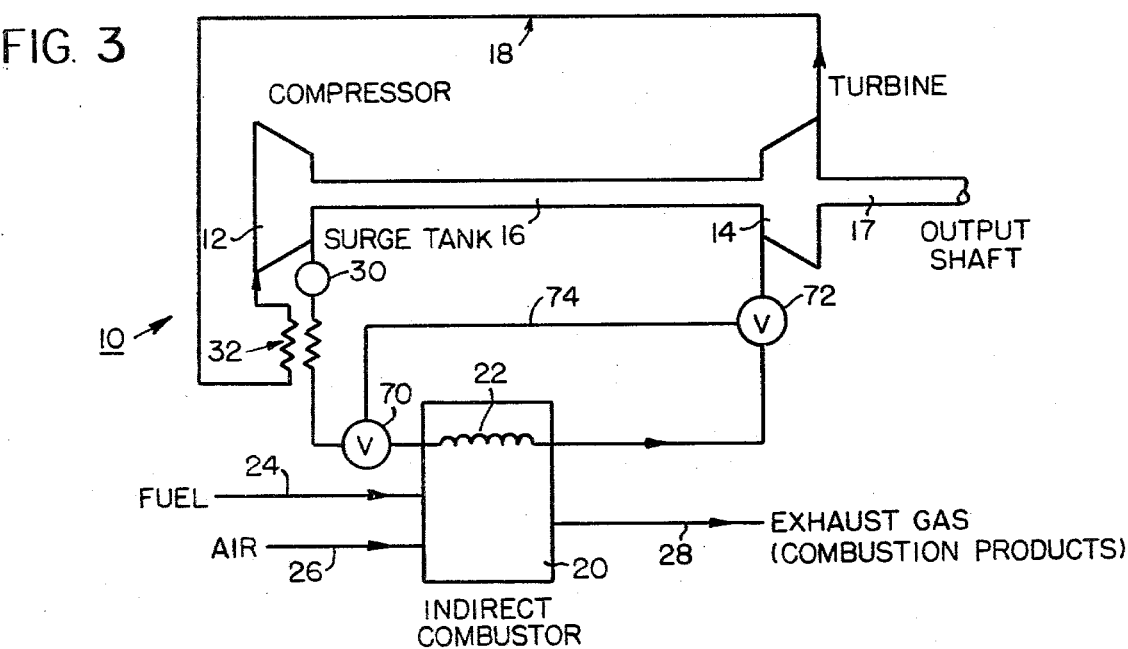
FIG. 3 is a partly schematic, partly diagrammatic drawing of another embodiment of the present invention similar to that of FIG. 1 with the addition of a by-pass conduit for use during the cool phase.

FIG. 3 shows another embodiment of the present invention similar to that shown in FIG. 1, with the exception of the addition of regulator valves 70 and 72 and a by-pass line or conduit 74 for the working gas. The operation of this by-pass line 74 is as follows: instead of having an intermittent burn in the indirect combustor 20, the combustion can be continuous. However, during the cool phase, the valves 70 and 72 can be switched to direct the working gas flow through the line 74 rather than through the portion of the line 18 containing the coil 22, thus by-passing the indirect combustor 20. This provides a flow of cooler working gas to the turbine 14 during the cool phase. This embodiment provides an intermittent hot-cool cycle rather than an intermittent burn-cool cycle. That is, the burn can be either continuous or intermittent. The important point being that the flow of working gas to the turbine is hot during the hot period and cool during the cool period to effectuate the results described in detail in said parent application Ser. No. 879,969, whereby a much higher turbine inlet temperature can be used than in the continuous burn mode of the prior art. This alternating hot-cool cycle prevents the turbine blades from soaking to the high temperature of the gas during the hot phase (up to 4500° F. for example). During the cool phase, the blades or at least the surfaces thereof are cooled back down to a lower temperature. During the cycle, the turbine blades are not allowed to soak to a temperature higher than that at which they could successfully operate, taking into account their tensile strength, the temperature range, and the rpm of the turbine.

Figure 4:
FIG. 4 is a graph plotting thermal efficiency against pressure ratio.

FIG. 4 is a graph showing thermal efficiency vs. pressure ratio and is found in the "Standard Handbook For Mechanical Engineers", 7th Edition, by Baumeister and Marks, at page 9–152 (FIG. 9). The higher temperature used in the present invention gives an increased specific heat. One benefit is that one pound of air processed through the gas turbine of this invention can carry more energy which gives a higher horsepower per pound of air. An increase in specific heat means less required pressure in gas turbine service which alleviates the compressor design and associated problems. If a monotomic gas is used (for example neon, Krypton or argon), then a significantly higher heat capacity ratio is available, which results in increased thermal efficiency, a decrease in required pressure ratio (see FIG. 4), and a lower air-to-fuel ratio.

In addition, the closed cycle system can operate at higher total pressures while maintaining the same pressure ratio. Thus, an open cycle system may operate at a pressure ratio of 4 to 1, for example, with an inlet at one atmosphere and an outlet at 4 atmospheres. The closed system may operate at the same ratio (4 to 1) but at, for example, 5 atmospheres inlet and 20 atmospheres outlet. Compressor work depends only on pressure. The higher total pressure means a higher working gas density. This results in, among other things, a smaller machine for the same power level. The higher density of the gas also directly reduces any heat exchange requirements. The indirect heating in the present invention will expedite the use of solid fuels such as coal, wood, etc. In the present invention it is noted that the exhaust gas volume is greatly reduced over that of a conventional continuous burn gas turbine. In addition, the working gas flow rates can be more easily varied or throttled without fear of burning up the combustor. Indirect combustors tend to be larger and bulkier than the direct combustors in open cycle gas turbines. However, it is noted that while one of the basic problems with an indirect combustor is one of residence time, the intermittent burn-cool or hot-cool cycle of the present invention changes this. That is, first the actual air flow in the combustion process is low. A ten second burn period can retain all of the products of combustion for the entire ten second period. All of this time, and during the cool phase or no burn phase, the working gas is continuously circulating, picking up heat (even though the fuel burn has been stopped), and converting it to useful work. When all (or substantially all) of the heat has been scavenged from the indirect combustor, and the turbine is sufficiently cooled, the gas in the indirect combustor is then exhausted and the cycle is repeated. While the gas can be exhausted to ambient, it can alternatively be usefully employed, since it is under pressure, to run, for example, another power wheel. Thus, the air flow through the indirect combustor (in the embodiments of FIGS. 1 and 2, for example) can be of the flow-store-exhaust type of pulse operation. It is noted that pressures in the range of 2,000 psig can be used and will be of particular importance in central station power and combined cycle power systems. In one embodiment the compressor need not be used; the resultant drawing would be similar to FIG. 1 of this application (or FIG. 14 of Ser. No. 879,969 for example) except that no compressor would be included.

As can be seen from the above description, the present gas turbine system does not require a regenerator, although such can be used, if desired. Most importantly, the closed cycle embodiment of the present invention does not require the large amounts of pre-cooling water used in the prior art, because the present invention employs a much smaller quantity of gas (because of the low air-to-fuel ratio), and a much smaller amount of heat is contained in the exhaust gas, as discussed above. The working gas is used over and over and remains in its owned closed and clean environment. A large number of different gases or mixtures of gases can be used as the working gas in the present invention. The gas turbine of the present invention can be used with multiple shafts, with various types of flywheels in combined cycle systems, with additional heat exchangers, etc. all as described in said parent applications. Regarding the type of gas used for the working gas, an inert, clean gas will tend to minimize the high temperature oxidation and sulfidation corrosion processes. In addition, the possibility of deposits, for example, from combustion products occurring on the critical structures of the gas turbine is minimized.

The time period of the hot phase is preferably from about 0.1 second to about 5 minutes, and the cool phase of from about 0.1 second to 5 minutes. Since the present invention does not require any secondary air for cooling the combustion products, the compressor requirements are much less than in the prior art. In the present invention, the hottest temperature of the gas is at the turbine inlet, whereas in the prior art it was in the primary combustion zone of the combustor, and large quantities of secondary air were then added to the combustion products to cool them to about 1000° F. at the turbine inlet. Thus, in the prior art at the temperature of the gases went up and then back down to the inlet. In this invention, however, the temperature is continuously increased up to the turbine inlet to get its temperature as high as possible. The turbine blades are not allowed to soak to this temperature, however. The hot phase is interrupted prior to such soaking, by the coal phase, and the turbine blade mean temperature is maintained at a level that is acceptable and at which there will be no excessive creep or other modes of failure due to a combination of high temperatures and high stresses. As mentioned earlier, the present invention operates on the Brayton cycle, that is, at constant pressure, in contrast to an Otto or Diesel constant volume cycle.

The invention has been described in detail with particular reference to the preferred embodiments thereof, but it will be understood that variations and modifications can be effected within the spirit and scope of the invention as described hereinabove and as defined in the appended claims.

What is claimed is:

1. A gas turbine engine including a gas compressor, a gas heater, and a gas turbine, all operating in a continuous closed operating gas cycle,
   said gas heater being a heat exchanger and having a combustion chamber for burning fuel and generating heat, and a gas conduit to convey said operating gas in heat exchange relationship through said combustion chamber to absorb heat therefrom,
   means to cycle the operation of said gas heater in an alternate and regular burn and non-burn operation cycle whereby said operating gas absorbs heat from said combustion chamber during the burn phase of said cycle and said operating gas absorbs heat from said gas turbine during the non-burn phase of said cycle, said operating cycle being so proportioned as to the relative lengths of said burn phase and said non-burn phase that the blades of said gas turbine do not soak to the temperature of said operating gas during said burn phase.

2. A gas turbine engine as defined in claim 1 in which said engine operates in said gas cycle between a first operating gas pressure $P_1$ at compressor intake and a second operating gas pressure $P_2$ at compressor discharge, wherein $P_1$ is greater than atmospheric.

3. A gas turbine engine as defined in claim 1 in which said gas heater further includes an accumulator in association with said combustion chamber for temporary residence of combustion products from said combustion chamber,
   whereby said operating gas continues to absorb heat from said accumulator for at least part of the non-burn phase of said cycle.

4. A gas turbine engine including a gas compressor, a gas heater, and a gas turbine, all operating in a continuous closed operating gas cycle,
   said gas heater being a heat exchanger and having a combustion chamber for burning fuel and generating heat, and a gas conduit to convey said operating gas in heat exchange relationship through said combustion chamber to absorb heat therefrom,
   means to cycle the operation of said engine in an alternate and regular heat-cool operating cycle whereby said operating gas absorbs heat from said combustion chamber during the heat phase of said cycle and said operating gas absorbs heat from said gas turbine during the cool phase of said cycle, said operating cycle being so proportioned as to the relative lengths of said heat and cool phases that the blades of said gas turbine do not soak to the temperature of said operating gas during said heat phase.

5. The apparatus according to claim 4 including means for continuously burning fuel in said combustion chamber and wherein said closed conduit includes a by-pass conduit around said combustion chamber and including valve means for feeding said working gas through said indirect combustion chamber during the heat phase of said heat-cool cycle and through said by-pass conduit during the cool phase of said heat-cool cycle.

* * * * *